F. G. KOEHLER.
REMOVABLE JOURNAL BOX.
APPLICATION FILED MAY 2, 1913.
1,188,949.
Patented June 27, 1916.
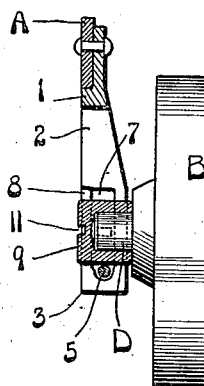
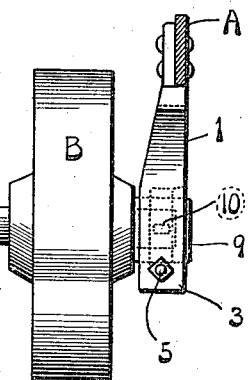
Fig. I.
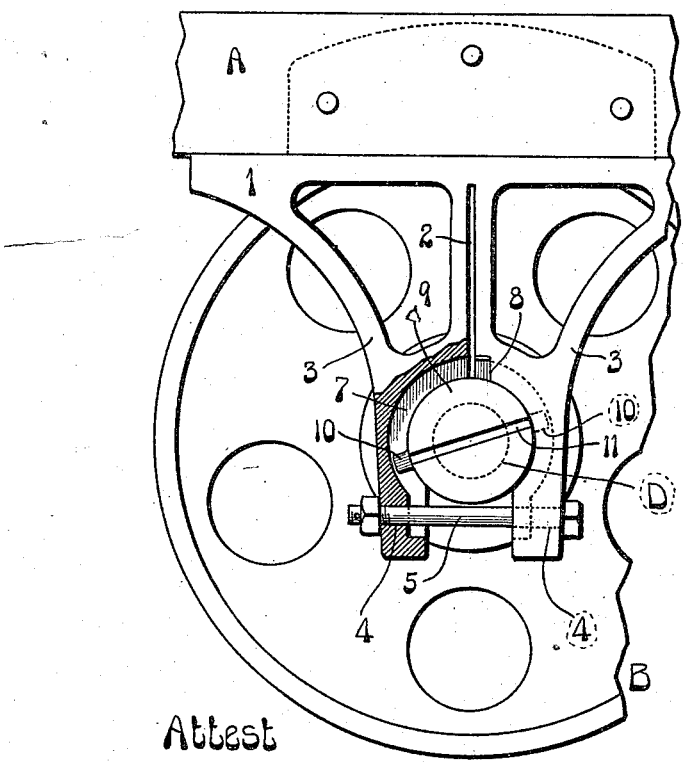
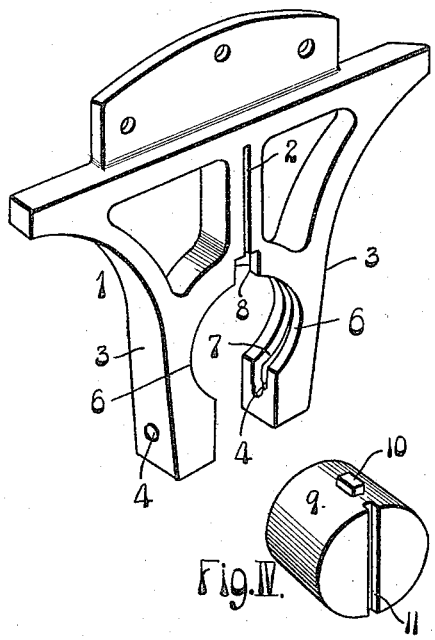
Attest
a.J.McCauley
E.B. Linn
Inventor:
F.G. Koehler,
by Knight & Cook
Attys.

UNITED STATES PATENT OFFICE.

FRANK G. KOEHLER, OF ST. LOUIS, MISSOURI.

REMOVABLE JOURNAL-BOX.

1,188,949.

Specification of Letters Patent.

Patented June 27, 1916.

Application filed May 2, 1913. Serial No. 765,030.

*To all whom it may concern:*

Be it known that I, FRANK G. KOEHLER, a citizen of the United States of America, and a resident of the city of St. Louis and State of Missouri, have invented certain new and useful Improvements in Removable Journal-Boxes, of which the following is a full, clear, and exact description, reference being had to the accompanying drawings, forming a part of this specification.

My invention relates to an improvement in trucks, the invention having for its object the production of a truck structure embodying pedestals and bearings removably mounted therein, which latter are replaceable at a minimum expense due to the journal bearings only being discarded.

Figure I is a view, partly in elevation and partly in section, of a truck having my improvements embodied therein. Fig. II is a view of my truck showing one of the pedestals partly in side elevation and partly in vertical section. Fig. III is a perspective view of one of the pedestals. Fig. IV is a perspective view of one of the journal bearings.

In the drawings: A designates the side members of a truck of any ordinary construction, and B are the truck wheels on an axle C. The axle C is provided with journals D, (see Fig. I), which extend outwardly beyond the hubs of the wheels.

1 designates the pedestals of my truck which may be secured to the sides of the truck frame in any suitable manner. Each pedestal is provided with a slit 2, extending downwardly from a point near the upper end of the pedestal, and due to the presence of which the pedestal is divided into two legs 3, which permit of the pedestal being contracted in width. The legs of the pedestals are spaced from each other at their lower ends to a sufficient degree to permit the passage of the journals of the truck axle through the gap between the legs, and each leg is provided with a horizontal bolt hole 4 in alinement with a corresponding bolt hole of the other leg, these bolt holes receiving a bolt 5 that spans the gap between the pedestal legs. Each pedestal leg is provided at its inner face with a concave socket 6, and extending inwardly in the legs from the walls of these sockets are grooves 7, which terminate at their lower ends adjacent the lower ends of the sockets, and at their upper ends at the location of a notch 8 between the opposing sockets extending inwardly from the outer face of the pedestal.

9 designates cylindrical cup shaped journal bearings which seat between the legs of the pedestals and have their open ends innermost in the pedestals in order that the car axle journals D may seat in the bearings to turn therein, while the bearings remain stationary. The peripheries of the bearings rest in contact with the walls of the sockets 6 and upon such peripheries, intermediate of the ends of the bearings, are lugs 10, which are positioned in the grooves 7 and serve to hold the bearings from longitudinal movement in the pedestals during their service.

In assembling the parts herein described, the truck frame, with the pedestals attached thereto, is so disposed as to permit passage of the journals of the truck axle through the gaps between the legs of the pedestals previous to the introduction of the bearings 9, and the bolts 5. The journals having been positioned between the sockets 6 of the pedestal legs, the cylindrical cup shaped bearings 9 are introduced into the pedestals in such manner that one of the lugs 10 of each bearing will pass through the notch at the junction of the side sockets, while the other lug 10 is lowermost and occupies a position in the gap between the lower ends of the legs of the pedestal. The bearings 9 are then rotated so that the lugs 10 will enter into the opposite grooves 7 extending inwardly from the walls of the socket 6. After the bearings have been adjusted, as explained, the bolts 5 are passed through the legs of the pedestals, and nuts are applied to the bolts to draw the pedestal legs toward each other, with the result of clamping the bearings tightly between the pedestal legs to hold them from movement, when the journals rotate therein during the use of the truck.

When there is occasion for renewal of a journal bearing, it is only necessary to remove the bolt 5, thereby releasing the clamping action upon the bearing to be removed, and said bearing may be so adjusted as to dispose its lugs 10 so that the latter may be slipped out of the pedestal through the notch 8, and the gap between the lower ends of the pedestal legs, previous to the introduction and securing of a new bearing in the same manner as that first described. For convenience in insertion, removal and adjustment of the bearings, I provide slots 11 in their outer ends, into which a screw driver, or other implement, may be inserted to partially rotate the bearings.

It will be quite apparent that by my improvement I provide a construction and arrangement which permits the renewal of journal bearings of trucks at a minimum of expense and labor. The bearings utilized may be manufactured at slight cost, and discarded when worn without discarding the entire pedestal in which they are used; and the labor involved in replacing the bearings being very slight, the substitution of a new bearing for a worn one may be expeditiously performed.

I claim:—

1. The combination of a truck pedestal open at the bottom to receive a journal, said pedestal being formed with a pair of legs each of which is provided with an arcuate seat for the reception of a journal box, an arcuate groove being formed in the pedestal structure, a cylindrical journal box arranged between said legs and rotatably fitted to said arcuate seats, said cylindrical journal box being provided with a peripheral lug adapted to be inserted into said arcuate groove to interlock said journal box with the pedestal, and means for retaining said lug in said arcuate groove, said means including a device for limiting the rotary movement of said journal box.

2. The combination of a truck pedestal open at the bottom to receive a journal, said pedestal being formed with a pair of legs each of which is provided with an arcuate seat for the reception of a journal box, an arcuate groove being formed in the pedestal structure, a cylindrical journal box arranged between said legs and rotatably fitted to said arcuate seats, said cylindrical journal box being provided with a peripheral lug adapted to be inserted into said arcuate groove to interlock said journal box with the pedestal, and means for retaining said lug in said arcuate groove, said means including a bolt connecting the ends of said legs and adapted to be engaged by the peripheral lug on the journal box so as to limit the rotary movement of said journal box.

3. The combination of a truck pedestal open at the bottom to receive a journal, said pedestal being formed with a pair of legs each having an arcuate seat for the reception of a journal box, a cylindrical journal box arranged between said legs and rotatably fitted to the arcuate seats on said pedestal, the pedestal being provided with a notch and an arcuate groove communicating with said notch, and said cylindrical journal box being provided with a peripheral lug adapted to pass through said notch and into said arcuate groove so as to interlock the journal box with the pedestal, and a stop member for retaining said peripheral lug in said arcuate groove.

4. The combination of a truck pedestal primarily open at the bottom to receive a journal, a journal box arranged within and rotatably fitted to said pedestal, and fastening means for securing said journal box in said pedestal; said fastening means including a lug formed on one of said parts and interlocked with the other, said journal box being removable from the pedestal when turned to a predetermined position with respect to said pedestal, and a removable stop for limiting the rotary movement of said journal box to prevent it from turning to said predetermined position.

FRANK G. KOEHLER.

In the presence of—
A. J. McCAULEY,
E. B. LINN.

Copies of this patent may be obtained for five cents each, by addressing the "Commissioner of Patents, Washington, D. C."